Figure 1:
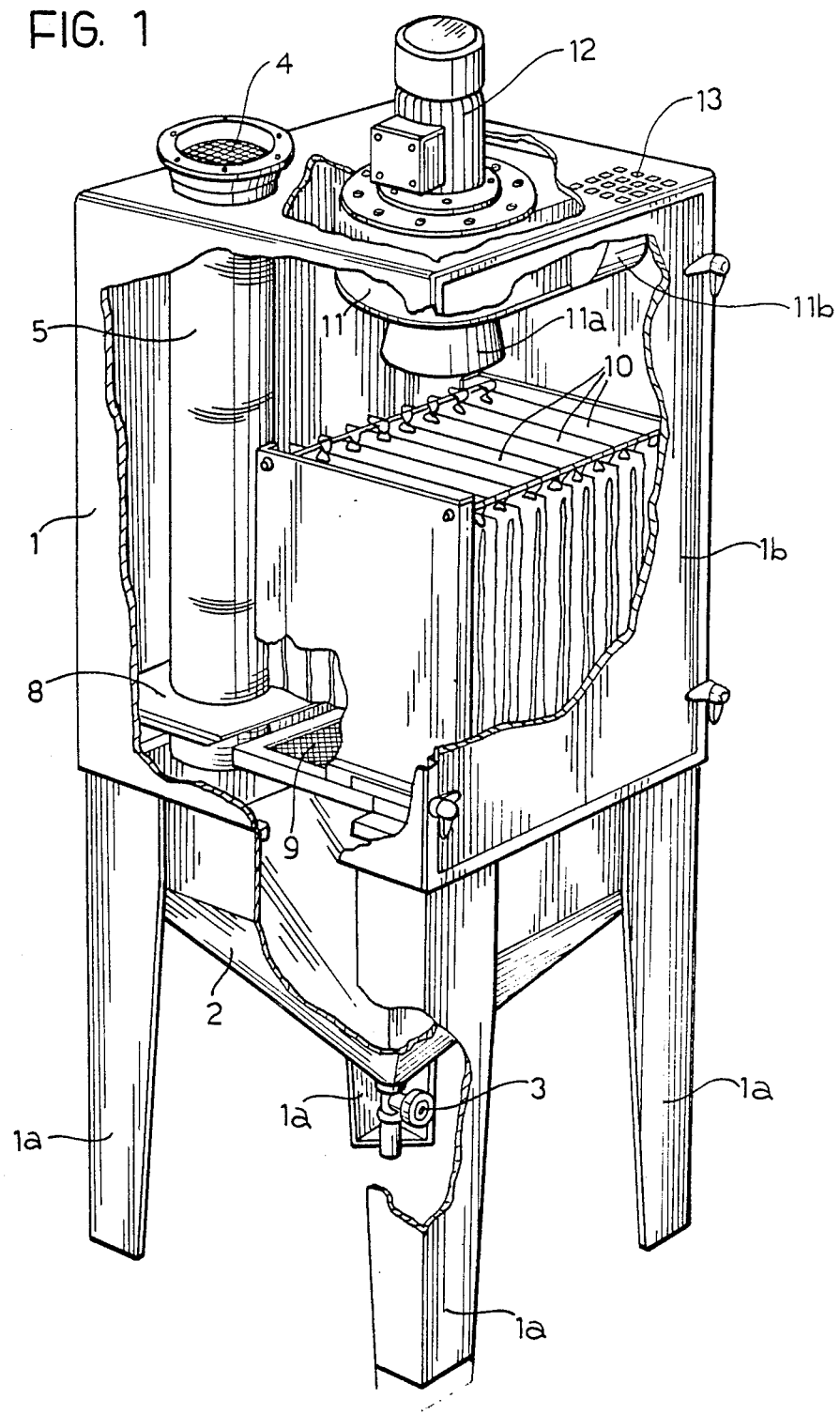

United States Patent [19]

Coral

[11] Patent Number: 4,946,483
[45] Date of Patent: Aug. 7, 1990

[54] FILTER FOR THE SEPARATION OF OILY FUMES

[75] Inventor: Luciano Coral, Leini, Italy

[73] Assignee: Coral S.p.A., Turin, Italy

[21] Appl. No.: 362,910

[22] Filed: Jun. 8, 1989

[30] Foreign Application Priority Data

Jun. 10, 1988 [IT] Italy ............................ 53221/88[U]

[51] Int. Cl.⁵ ..................... B01D 45/12; B01D 46/02
[52] U.S. Cl. ........................... 55/323; 55/334; 55/337; 55/341.1; 55/449; 55/456; 55/458
[58] Field of Search ................ 55/319, 323, 334, 337, 55/341.1, 439, 447, 449, 456, 458, DIG. 25

[56] References Cited

U.S. PATENT DOCUMENTS

| | | | |
|---|---|---|---|
| 1,177,262 | 3/1916 | O'Donnell | 55/319 X |
| 2,511,967 | 6/1950 | Campbell | 55/458 X |
| 3,633,343 | 1/1972 | Mark | 55/323 |
| 3,780,502 | 12/1973 | Dupre et al. | 55/341.1 X |
| 4,187,089 | 2/1980 | Hodgson | 55/DIG. 25 |
| 4,224,043 | 9/1980 | Dupre | 55/341.1 X |
| 4,297,116 | 10/1981 | Cusick | 55/319 |
| 4,487,618 | 12/1984 | Mann | 55/DIG. 25 |
| 4,516,994 | 5/1985 | Kocher | 55/337 |
| 4,702,893 | 10/1987 | Kirk et al. | 55/DIG. 25 |

FOREIGN PATENT DOCUMENTS 883225 6/1943 France .
2169822 7/1986 United Kingdom .

Primary Examiner—Robert Spitzer
Attorney, Agent, or Firm—Sughrue, Mion, Zinn, Macpeak & Seas

[57] ABSTRACT

The air in which the oil particles are suspended is drawn from the environment through an air intake (4) as a result of the vacuum created by a centrifugal aspirator (11) and then passes along a substantially vertical duct (5) in which an internal helical element (6) causes the mechanical separation of the oil particles by centrifugal action due to the rotation of the air imparted by the helix, the oil particles collecting on the wall of the duct (5) from which they drain into a collecting hopper (2), after which the air is further filtered by an additional filter (9, 10) before reaching the delivery opening (13).

4 Claims, 2 Drawing Sheets

FILTER FOR THE SEPARATION OF OILY FUMES

The present invention relates to filters for use in working environments to separate oily fumes.

The object of the invention is to provide a filter of the type indicated above, which has a simple, cheap construction and can achieve very effective separation of the oily particles in the air of the environment in which the filter is installed.

In order to achieve this object, the filter according to the present invention comprises:

a closed casing with a collecting hopper at the bottom and an upper air intake which communicates with a centrifugal mechanical separator constituted by a substantially vertical duct whose lower end opens into the collecting hopper and in which a fixed helical element surrounded by wire mesh is inserted, additional filtering means interposed in the path for the air between the lower end of the duct and a delivery opening which is situated at the top of the casing and adjacent which induction means are provided for drawing the air from the interior of the casing and expelling it to the exterior through the delivery opening.

By virtue of the above arrangement and combination of parts, the air in which the oil particles are suspended is drawn from the environment through the air intake as a result of the vacuum created by the induction means, passes along the vertical duct in which the internal helical element causes the mechanical separation of the oil particles by centrifugal action due to the rotation of the air imparted by the helix, the oil particles being projected against the wall of the duct where they are held in the wire mesh and drain into the collecting hopper, and the air is then further filtered by the additional filtering means before reaching the delivery opening.

Figure 2:
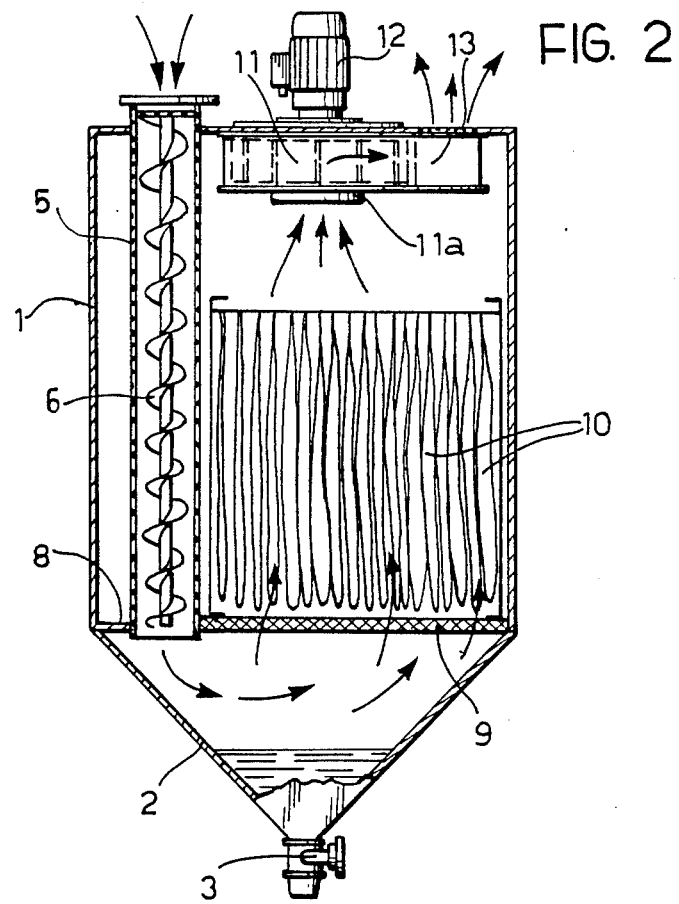
Figure 3:
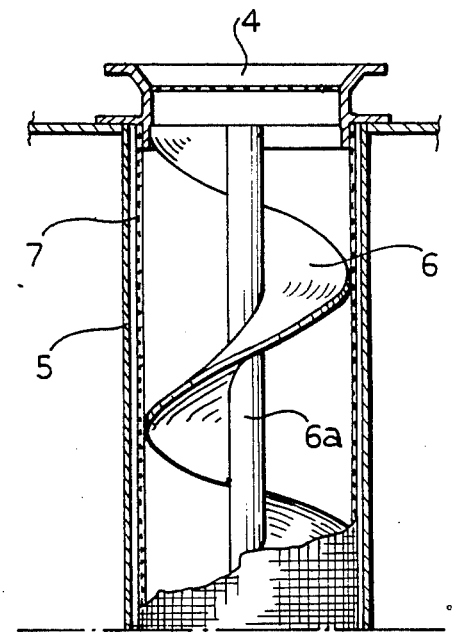

Further characteristics and advantages of the present invention will become clear from the description which follows with reference to the appended drawings, provided by way of non-limiting example, in which:

FIG. 1 is a partially-sectioned perspective view of a filter for the separation of oily fumes according to the invention, FIG. 2 is a partial vertical section of the filter according to FIG. 1, and FIG. 3 is a detail of FIG. 2, on an enlarged scale.

In the drawing, a parallelepipedal casing, indicated 1, is supported by legs 1a and has a door 1b for access to the inside of the casing.

A hopper 2 is provided at the bottom of the casing and its base has an outlet controlled by an obturator 3 which is constituted by a tap in the example illustrated, but could be constituted by other means, such as, for example, a screw plug or the like.

The top of the casing 1 has an air intake 4 which communicates with a tube 5 extending substantially vertically within the casing 1 and opening into the collecting hopper 2 at its lower end.

A fixed helical element constituted by a band 6 wound helically around a central cylindrical shaft 6a is arranged in the tube 5.

The helical element 6 is surrounded by a wire mesh tube 7 interposed between the helical element and the inner wall of the tube 5.

The tube 5 passes through a horizontal dividing wall 8 and opens into the hopper 2 below.

A wire mesh filter, indicated 9, is situated horizontally at the bottom of the casing 1 beside the wall 8, and conventional filtering means, indicated 10, are arranged in the casing 1 above the mesh filter 9.

In the example illustrated, these filtering means are constituted by a pocket-type filter. According to requirements, other types of filters may be used, for example, activated-carbon filters.

Above the filter 10, the upper wall of the casing 1 carries a centrifugal aspirator 11 operated by an electric motor 12 and having an intake opening 11a and a delivery duct 11b which leads to a delivery opening 13.

The filter described above operates in the following manner.

The air from the environment in which the oil particles are suspended is drawn in through the air intake 4, as a result of the vacuum created within the casing 1 by the centrifugal aspirator 11, and passes through the vertical duct constituted by the tube 5, in which the oil particles are separated mechanically by centrifugal action due to the rotation of the air imparted by the helical element 6 The oil particles thus separated collect on the wall of the tube 5, where they are held by the wire mesh 7 and drain into the collecting hopper 2 from which they are periodically drained by the operation of the obturator 3.

The air from the duct 5 is further filtered as it passes through the metal filter 9 and the pocket-type filter 10 and is sent to the delivery opening 13 by the centrifugal aspirator 11 for return to the environment.

The combined effect of the mechanical separation of the oil particles in the duct 5 and the filtration by the metal filter 9 and the pocket-type filter 10 ensures very effective cleaning of the air of an environment in which oily fumes are present.

I claim:

1. A filter e separation of oily fumes, characterised in that it comprises:

a closed casing (1) with a collecting hopper (2) at the bottom and an upper air intake (4) which communicates with a centrifugal mechanical separator constituted by a substantially vertical duct (5) whose lower end opens into the collecting hopper and in which a fixed helical element (6) surrounded by wire mesh (7) is inserted, additional filtering means (9, 10) interposed in the path for the air between the lower end of the duct (1) and a delivery opening (13) which is situated at the top of the casing and adjacent which induction means (11) are provided for drawing the air from the interior of the casing (1) and expelling it to the exterior through the delivery opening (13), so that the air in which the oil particles are suspended is drawn from the environment through the air intake (4) as a result of the vacuum created by the induction means (11), and passes along the substantially vertical duct (1) in which the internal helical element (6) causes the mechanical separation of the oil particles by centrifugal action due to the rotation of the air imparted by the helix, the oil particles collecting on the wall of the duct (5) from which they drain into the collecting hopper (2), after which the air is further filtered by the additional filtering means (9, 10) before reaching the delivery opening (13).

2. A filter according to claim 1, characterised in that the additional filtering means comprise a metal prefilter (9) situated at the top of the collecting hopper (2) and a plurality of conventional filtering elements (10) arranged in the casing (1) between the metal filter (9) and the intake opening (11a) of the induction means (11).

3. A filter according to claim 2, characterised in that the conventional filtering elements (10) are constituted by pocket-type filters.

4. A filter according to claim 1, characterised in that the bottom of the hopper (2) cf the casing (1) has a drain hole which is closed by obturator means (3) for enabling the periodic draining of the oil collected in the hopper (2).

* * * * *